«12» United States Patent  (10) Patent No.: US 7,354,747 B1
Guan  (45) Date of Patent: Apr. 8, 2008

(54) CARBOHYDRATE DERIVED PROTEIN RESISTANT BIOMATERIAL

(75) Inventor: Zhibin Guan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/842,711

(22) Filed: May 10, 2004

Related U.S. Application Data

(60) Provisional application No. 60/468,860, filed on May 8, 2003.

(51) Int. Cl.
*C12P 7/00* (2006.01)
*C12P 11/00* (2006.01)
*G01N 33/44* (2006.01)
*C08G 18/48* (2006.01)

(52) U.S. Cl. .................. 435/127; 435/119; 436/85; 524/762

(58) Field of Classification Search ............... 435/7.92, 435/127, 119; 514/668; 436/85; 524/762
See application file for complete search history.

(56) References Cited

U.S. PATENT DOCUMENTS 5,626,863 A * 5/1997 Hubbell et al. ............. 424/426

FOREIGN PATENT DOCUMENTS

EP 741128 A2 * 11/1996

OTHER PUBLICATIONS

Mancera et al. New derivatives of D-mannaric and galacraric acids. Synthesis of a new stereoregular Nylon 66 analog from carbohydrate-based monomers having the D-manno configuration. Carbohydrate Research, 338 (2003) 1115-1119.*
Garcia-Martin et al. Synthesis of L-arabinitol and xylitol monomers for the preparation of polyamides. Preparation of an L-arabinitol-based polyamide. Carbohydrate Research 333 (2001) 95-103.*
Chucholowaski et al. (EP 741128A2) Preparation of sulfate esters of aminosugar derivatives for the inhibition of the migration and proliferation of vascular smooth muscle cells. CAPLUS Accession # 1997:69419 CAPLUS, document # 126:89702.*
Ostuni et al., A Survey of Structure-Property Relationships of Surfaces that Resist the Adsorption of Protein, Langmuir, 2001, 17, 5605-5620.

* cited by examiner

*Primary Examiner*—Long V. Le
*Assistant Examiner*—Shafiqul Haq
(74) *Attorney, Agent, or Firm*—Latimer, Mayberry & Matthews Intellectual Property Law, LLP

(57) ABSTRACT

Carbohydrate-derived side-chain polyethers that may be synthesized by condensation polymerization of monomers derived from natural occurring carbohydrates. These compounds are protein resistant, biodegradable and may be functionalized at location other that the chain ends. Various devices, apparatus and articles of manufacture may be formed, at least in part, of the compounds of the present invention to achieve desirable protein resistance, biodegradability and/or functionalization.

6 Claims, 1 Drawing Sheet

US 7,354,747 B1

CARBOHYDRATE DERIVED PROTEIN RESISTANT BIOMATERIAL

RELATED APPLICATION

This application claims the benefit of U.S. Provisional Application Ser. No. 60/468,860 filed May 8, 2003, a portion of which is expressly incorporated herein by reference.

BACKGROUND

Protein resistant materials have heretofore been used in a number of applications, such as prostheses, sensors, substrates for enzyme-linked immunosorbent assays (ELISAs), materials for use in contact lenses, and implanted devices. More recent applications include systems for patterned cell cultures, tissue regeneration, microfluidic systems, drug delivery, and systems for high-throughput screening of proteins or cells.

Poly(ethylene glycol) (PEG) is among the most commonly used biomaterials because of its exceptional biocompatibility. PEG is known to be highly resistant to nonspecific protein binding. As a simple main-chain polyether, however, PEG has several limitations. The use of PEG in biomedical applications is, however, limited by the facts that a) PEG can only be functionalized at the chain ends and b) PEG is not biodegradable. For many biomedical applications, biodegradability and the flexibility to incorporate desired functionalities are critical.

Despite extensive research, the molecular mechanism for PEG's protein resistance is not yet fully understood. To generate structure-property correlation and to discover new structures resistant to protein binding, others have prepared self-assembled monolayers (SAM's) presenting substrates with various functional groups to test the protein binding of those substrates. Through those studies, it has been observed that protein resistant substrates exhibit (a) hydrophilicity, (b) the ability to accept hydrogen bonding, (c) the inability to donate hydrogen bonding, and (d) a net neutral charge. See, Ostuni, E.; Chapman, R. G.; Holmlin, R. E.; Takayama, S.; Whitesides, G. M. *Langmuir* 2001, 17, 5605-5620; Chapman, R. G.; Ostuni, E.; Takayama, S.; Holmlin, R. E.; Yan, L.; Whitesides, G. M. *J. Am. Chem. Soc.* 2000, 122, 8303-8304; Ostuni, E.; Chapman, R. G.; Liang, M. N.; Meluleni, G.; Pier, G.; Ingber, D. E.; Whitesides, G. M. *Langmuir* 2001, 17, 6336-6343 and Chapman, R. G.; Ostuni, E.; Yan, L. and Whitesides, G. M. *Langmuir* 2000, 16, 6927-6936.

There remains a need in the art for the synthesis and development of new protein resistant biomaterials which are biocompatable and/or can be functionalized at sites other than chain ends and/or are biodegradable.

SUMMARY OF THE INVENTION

The present invention provides new biomaterials which may be synthesized from readily available starting materials such as carbohydrates or other polyhydroxyl compounds. One major application of these new materials is as protein resistant biomaterials.

In accordance with the present invention, there are provided compounds having the general formula:

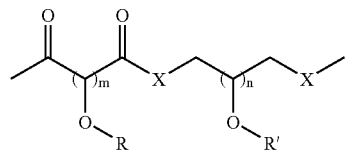

wherein,
R and R' are H or alkyl having 1-10 carbon atoms;
m and n are 2, 3, 4, 5 or 6; and
X is O, NH, NR or S.

Further in accordance with the present invention, there is provided a carbohydrate-derived side-chain polyether having the formula:

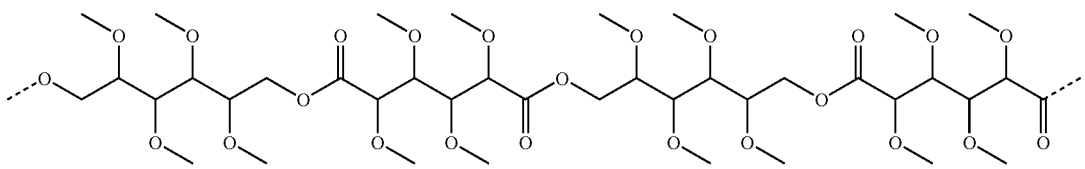

Still further in accordance with this invention, at least some of the compounds of the general formula set forth above are biodegradable and/or functionalizable at sites other than the chain ends.

Still further in accordance with the present invention there are provided apparatus and articles, such as prostheses, sensors, substrates for enzyme-linked immunosorbent assays (ELISAs), contact lenses, intraocular lenses, substrates or systems for patterned cell cultures, tissue regeneration, microfluidic systems, drug delivery apparatus, and systems for high-throughput screening of proteins or cells, which are formed at least partially of a compound having the above-set-forth general formula. Such compound may be disposed as a coating on at least a portion of a device, apparatus or article of manufacture.

DETAILED DESCRIPTION AND EXAMPLES

Figure 1:
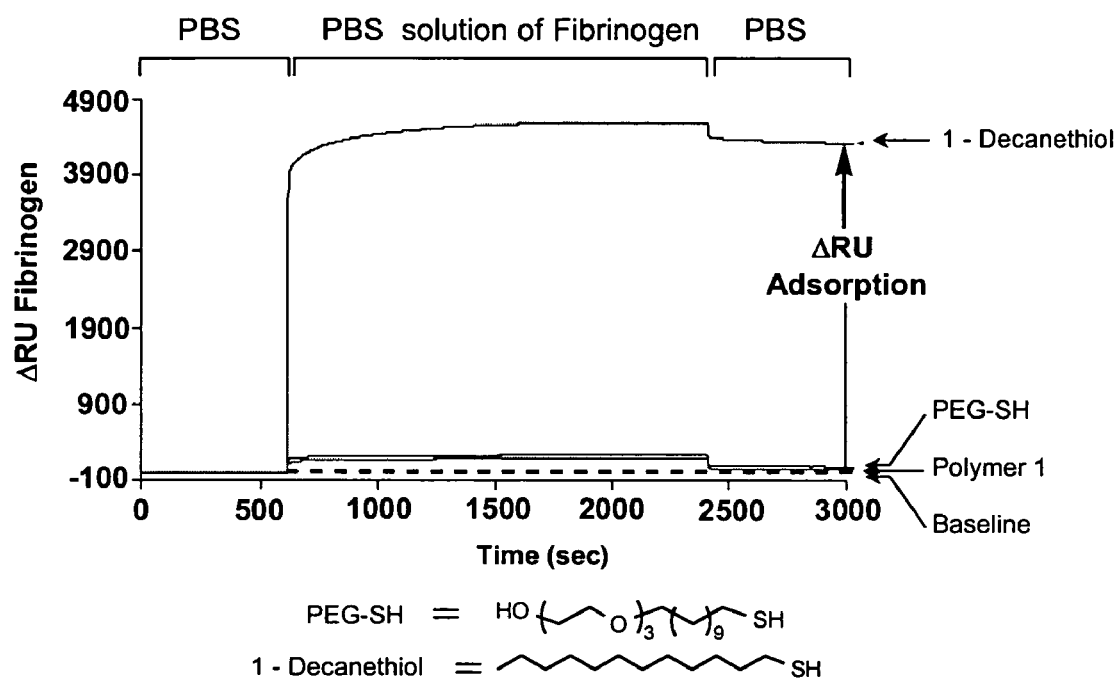
FIG. 1 is a graph showing SPR data for the adsorption of fibrinogen to a polymer of the present invention and control surfaces.

The following detailed description, including the examples set forth therein, is intended to describe only some of the potential embodiments or examples of the invention and is not intended to exhaustively describe all possible embodiments and examples of the invention. Thus, the following detailed description is not intended to limit the scope of the claimed invention in any way.

The present invention includes a novel carbohydrate-derived side-chain polyether that may be synthesized by condensation polymerization of monomers derived from natural occurring carbohydrates. Surface plasmon resonance spectroscopy studies demonstrate that this side-chain polyether has exceptional resistance to non-specific protein adsorption. The protein resistant capability of this side-chain polyether is comparable to that of polyethylene glycol, a main-chain polyether that is, to date, the best protein resistant material. In addition to the excellent biocompatibility, the new polymer also combines biodegradability and functionalizability. With these combined good properties, this side-chain polyether is envisioned as a new biomaterial for many potential biomedical applications.

More specifically, one example of the present invention is a new carbohydrate-derived side-chain polyether identified as Compound 1 in Chart 1 below:

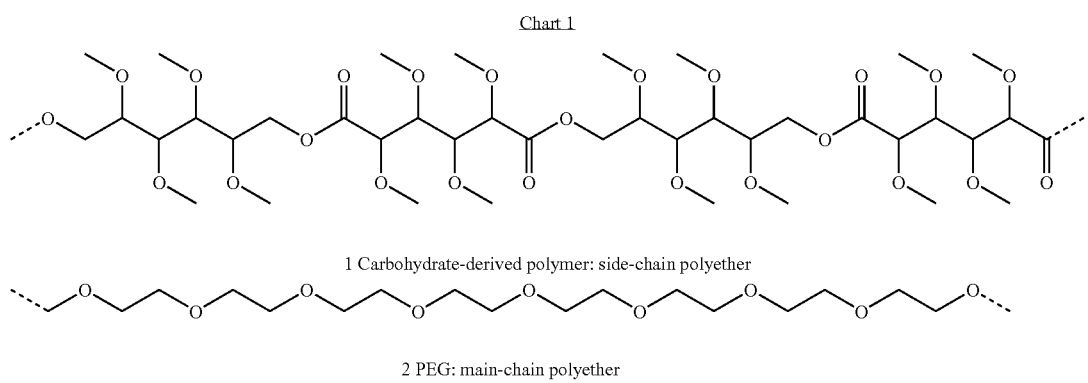

Chart 1

1 Carbohydrate-derived polymer: side-chain polyether

2 PEG: main-chain polyether

The design of compound 1 shown in Chart 1 above as a protein resistant biomaterial is based on several considerations. First, the structure of compound 1 matches the four criteria of (a) hydrophilicity, (b) the ability to accept hydrogen bonding, (c) the inability to donate hydrogen bonding, and (d) a net neutral charge identified by Whitesides et al. and described in the Background of the Invention section set forth hereabove. Indeed, compound 1 has a polyether structure analogous to PEG, however, it is a side-chain instead of main-chain polyether. Secondly, the repeating units in compound 1 are connected with ester linkages, rendering it biodegradable. Because ester linkages can be cleaved by simple acid-base or enzymatic hydrolysis, compound 1 will degrade into monomers in biological systems. Finally, the carbohydrate-derived monomers are naturally abundant and can be functionalized with various substituents. In addition, copolymerization with other diol or diacid monomers carrying desired functional groups should serve to introduce further functionalities to the polymer. The ability to functionalize the polymer of compound 1 should allow for a diverse range of applications.

An example of a synthetic route for the monomeric building blocks and compound 1 is shown in Scheme 1, as follows:

Scheme 1

A. Monomer synthesis:

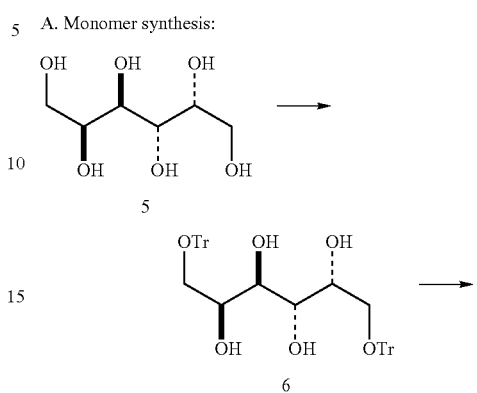

-continued

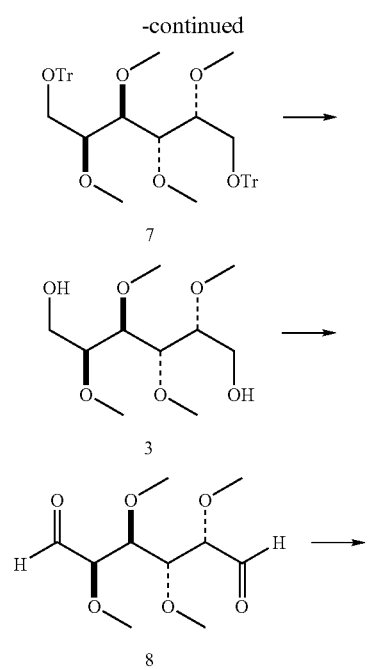

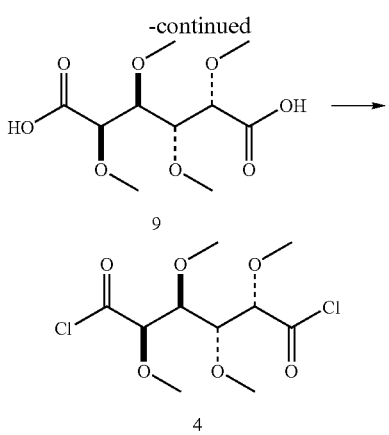

B. Polymerization

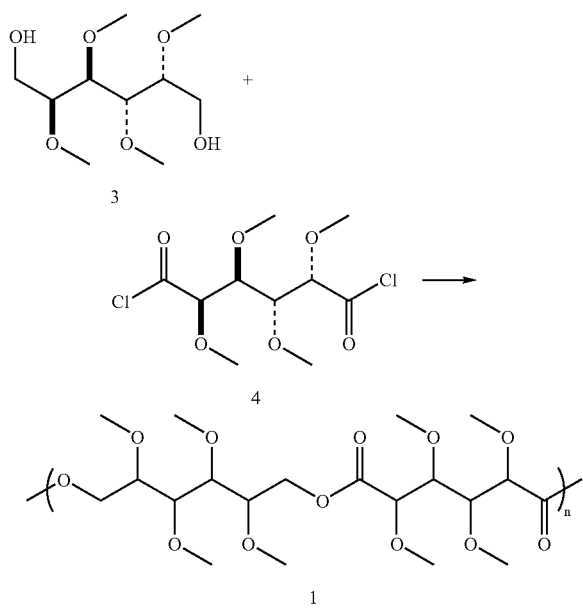

With reference to the synthetic route example shown in Scheme 1, a diol monomer 3 was synthesized from a commercially available reduced sugar, dulcitol 5. After selective protection of the two primary hydroxyls with trityl group, the secondary hydroxyl groups were permethylated with MeI under basic condition. The diol monomer 3 was obtained in good overall yield following deprotection of the trityl groups.

Direct oxidation at various conditions to convert 3 into diacid 9 was complicated by side reactions. To circumvent this, a two-step oxidation was applied in which the diol 3 was first oxidized to dialdehyde 8 through Swern oxidation and then further oxidized to the diacid 9 through Jones oxidation. Treatment of 9 with thionyl chloride at room temperature gave clean formation the diacidchloride monomer 4. After testing different polymerization conditions, homogeneous solution polymerization of 3 and 4 in dichloromethane using triethylamine as base gave the best results, affording polymer 1 with a number-averaged molecular weight ($M_n$) of 29,000 g/mol and a weight-averaged molecular weight $M_w$ of 44,000 g/mol. The monomodal GPC trace and the relatively narrow polydispersity ($M_w/M_n$=1.5) indicates that the polymerization follows standard step-growth mechanism. Polymer 1 is shown without specification of stereochemistry because there exists a combination of enantiomeric and diasteromeric repeating units in the polymer.[16]

Following successful synthesis of the side-chain polyether 1, its protein resistance was measured by Surface Plasmon Resonance (SPR) spectroscopy. SPR has gained increasing usage in evaluating protein adsorption to various surfaces. Following the methodology described by Whitesides and Mrksich's studies,[10-14] we measured the adsorption of two proteins: fibrinogen, a large (340 kD) blood plasma protein that adsorbs strongly to hydrophobic surfaces, and lysozyme, a small protein (14 kD, PI=12) that is positively charged under the conditions of our experiment (phosphate buffered saline, PBS, pH 7.4). Fibrinogen is used as a model for "sticky" serum proteins[18,19] and lysozyme is used as a model for electrostatic adsorption of proteins to surfaces.[20,21] Due to good water solubility of polymer 1, a terminal thiol-functionalized polymer 1 was prepared and chemisorbed onto gold slide for the SPR studies.[22] SAM's of 1-decanethiol and a tri(ethylene glycol) functionalized alkylthiol (PEG-SH) on gold were used for positive and negative control studies.

The SPR data for adsorption of fibrinogen in FIG. 1 show that the side-chain polyether 1 has excellent protein resistance. The amount of protein adsorbed (ΔRU=change in response units) as measured by SPR was determined by subtracting the value of RU prior to the injection of protein from the value of RU measured 10 min after the completion of the protein injection (as indicated by the vertical arrow in FIG. 1). Like the PEG model SAM, polymer 1 surface showed minimum adsorption of fibrinogen. Within the experimental error, the amount of protein adsorbed onto polymer 1 surface is about the same as the amount adsorbed to the model PEG SAM, which is about 1% of the amount adsorbed onto the hydrophobic 1-decanethiol SAM. The lysozyme adsorption data also showed that polymer 1 has the same protein resistance as the model PEG SAM (Supporting Information).

In summary, the carbohydrate-derived side-chain polyether shown as Compound 1 in Chart 1 above exhibits excellent protein resistance. This polymer may be synthesized through step-growth polymerization with monomers that can be derived from simple natural carbohydrates. The ester linkage in the polymer renders it biodegradable. Through the design of monomer structure and copolymerization, structural congeners, analogs or derivatives of Compound 1 with desired functionalities may be constructed. Thus, the present invention provides novel biomaterials that exhibit protein resistance, biodegradability and functionalizability.

Although the invention has been described above with respect to certain embodiments and examples, it is to be appreciated that such embodiments and examples are non-limiting and are not purported to define all embodiments and examples of the invention. Indeed, those of skill in the art will recognize that various modifications may be made to the above-described embodiments and examples without departing from the intended spirit and scope of the invention and it is intended that all such modifications be included within the scope of the following claims.

What is claimed is:

1. A polymer comprising units of formula:

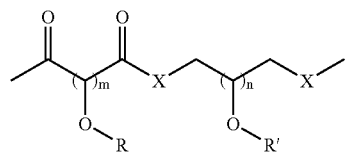

wherein,
R and R' are H or alkyl having 1-10 carbon atoms;
m and n are 2, 3, 4, 5, or 6; and
X is O or S.

2. A polyether compound having the structural formula:

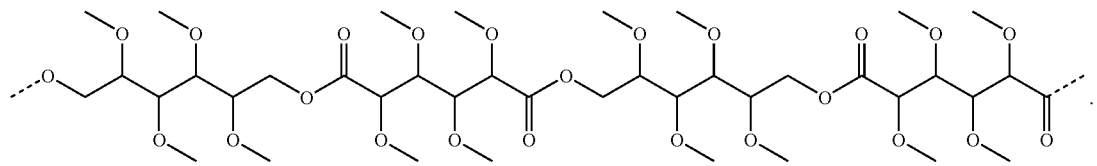

3. A device for use in contact with protein, said device comprising a polymer comprising units of formula:

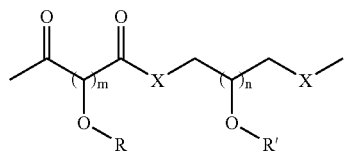

wherein,
R and R' are H or alkyl having 1-10 carbon atoms;
m and n are 2, 3, 4, 5, or 6; and
X is O or S.

4. A device according to claim 3 wherein the polymer comprises a polyether having the formula:

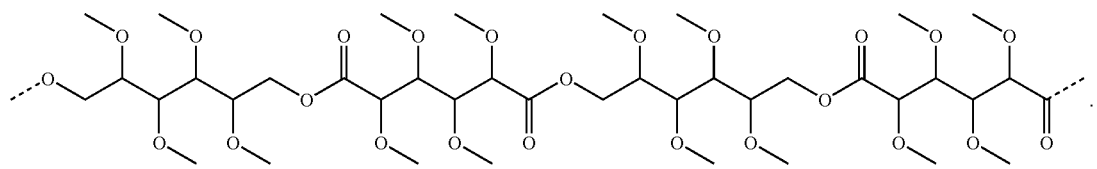

5. A device according to claim 3 wherein the polymer is disposed as a coating on at least a portion of the device.

6. A device according to claim 3 wherein the polymer is biodegradable.

* * * * *